US010575285B2

(12) United States Patent
Chen et al.

(10) Patent No.: US 10,575,285 B2
(45) Date of Patent: Feb. 25, 2020

(54) CONFIGURABLE THRESHOLD FOR FORMAT SELECTION FOR ENHANCED CARRIER AGGREGATION

(71) Applicant: QUALCOMM Incorporated, San Diego, CA (US)

(72) Inventors: Wanshi Chen, San Diego, CA (US); Peter Gaal, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 15/224,877

(22) Filed: Aug. 1, 2016

(65) Prior Publication Data

US 2017/0041922 A1    Feb. 9, 2017

Related U.S. Application Data

(60) Provisional application No. 62/200,569, filed on Aug. 3, 2015.

(51) Int. Cl.
*H04W 72/04* (2009.01)
*H04W 74/00* (2009.01)
(Continued)

(52) U.S. Cl.
CPC .......... *H04W 72/0413* (2013.01); *H04L 1/00* (2013.01); *H04L 1/0031* (2013.01); *H04L 1/0072* (2013.01); *H04L 1/1671* (2013.01); *H04L 1/1812* (2013.01); *H04L 1/1861* (2013.01); *H04L 5/0044* (2013.01); *H04L 47/365* (2013.01); *H04W 28/18* (2013.01); *H04W 28/24* (2013.01); *H04W 72/1268* (2013.01); *H04W 72/1284* (2013.01); *H04W 74/004* (2013.01); *H04W 76/27* (2018.02)

(58) Field of Classification Search
CPC . H04W 28/18; H04W 28/24; H04W 72/0413; H04W 72/1268; H04W 72/1284; H04W 74/004; H04L 47/365
See application file for complete search history.

(56) References Cited

U.S. PATENT DOCUMENTS 9,635,652 B2 *   4/2017   Wu ................... H04W 72/0413
2012/0039280 A1 *   2/2012   Chen .................... H04L 1/1861
                                                                            370/329
(Continued)

FOREIGN PATENT DOCUMENTS

WO        2010148319 A1    12/2010
WO        2012068141 A1    5/2012

OTHER PUBLICATIONS

International Search Report and Written Opinion—PCT/US2016/045111—ISA/EPO—dated Oct. 21, 2016.
(Continued)

*Primary Examiner* — Ashley Shivers
(74) *Attorney, Agent, or Firm* — Arent Fox, LLP

(57) ABSTRACT

Different control information formats offer tradeoffs between performance for a UE and multiplexing capability for different UEs. In one aspect, a user equipment (UE) determines a first threshold to apply in selecting a format from a plurality of formats and uses the format for a first transmission of control information. The first threshold to apply in the selection of the format is determined from a set of possible values with the UE determining a first size of a first payload for the first transmission and selecting a first format for the first transmission of control information based on the first size and the first threshold. The threshold may be configurable by a base station and can reflect channel conditions prevailing at the UE and/or the need for a multiplexing capability associated with different formats.

26 Claims, 11 Drawing Sheets

(51) Int. Cl.

| | |
|---|---|
| *H04W 72/12* | (2009.01) |
| *H04W 28/18* | (2009.01) |
| *H04L 12/805* | (2013.01) |
| *H04W 28/24* | (2009.01) |
| *H04L 1/00* | (2006.01) |
| *H04L 1/16* | (2006.01) |
| *H04L 1/18* | (2006.01) |
| *H04W 76/27* | (2018.01) |
| *H04L 5/00* | (2006.01) |

(56) References Cited

U.S. PATENT DOCUMENTS

| | | | |
|---|---|---|---|
| 2013/0121270 A1 | 5/2013 | Chen et al. | |
| 2014/0307694 A1* | 10/2014 | Zeng | H04W 72/042 370/329 |
| 2015/0092702 A1* | 4/2015 | Chen | H04W 72/082 370/329 |
| 2017/0134117 A1* | 5/2017 | Tan Bergstrom | H04L 5/001 |
| 2017/0366322 A1* | 12/2017 | Ahn | H04L 5/00 |
| 2018/0006791 A1* | 1/2018 | Marinier | H04L 1/0026 |

OTHER PUBLICATIONS

Samsung: "HARQ-ACK Transmission for Enhanced CA", 3GPP Draft; R1-152851, 3rd Generation Partnership Project (3GPP), Mobile Competence Centre ; 650, Route Des Lucioles ; F-06921 Sophia-Antipolis Cedex ; France vol. RAN WG1, No. Fukuoka, Japan; May 25, 2015-May 29, 2015, May 24, 2015 (May 24, 2015), XP050968402, 4 pages. Retrieved from the Internet: URL: http://www.3gpp.org/ftp/Meetings_3GPP_SYNC/RAN1/Docs/ [retrieved May 24, 2015].

\* cited by examiner

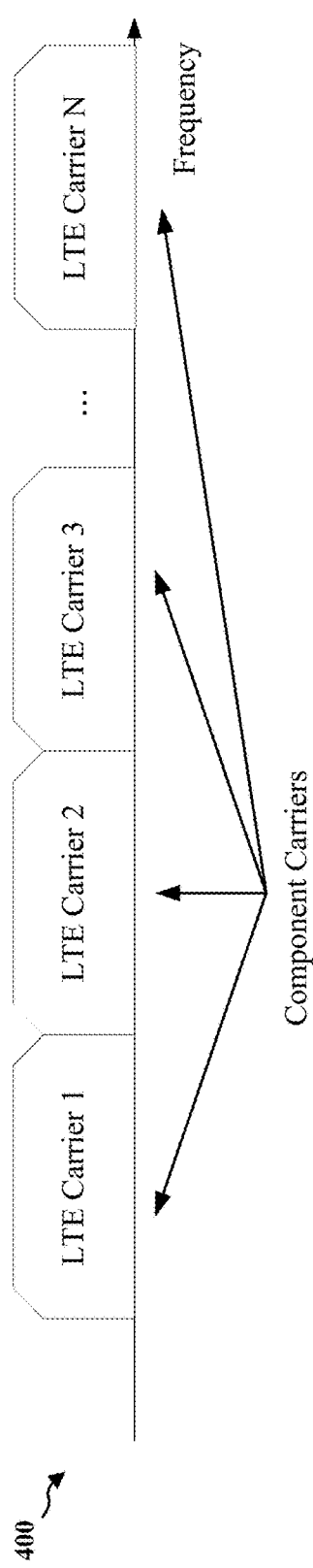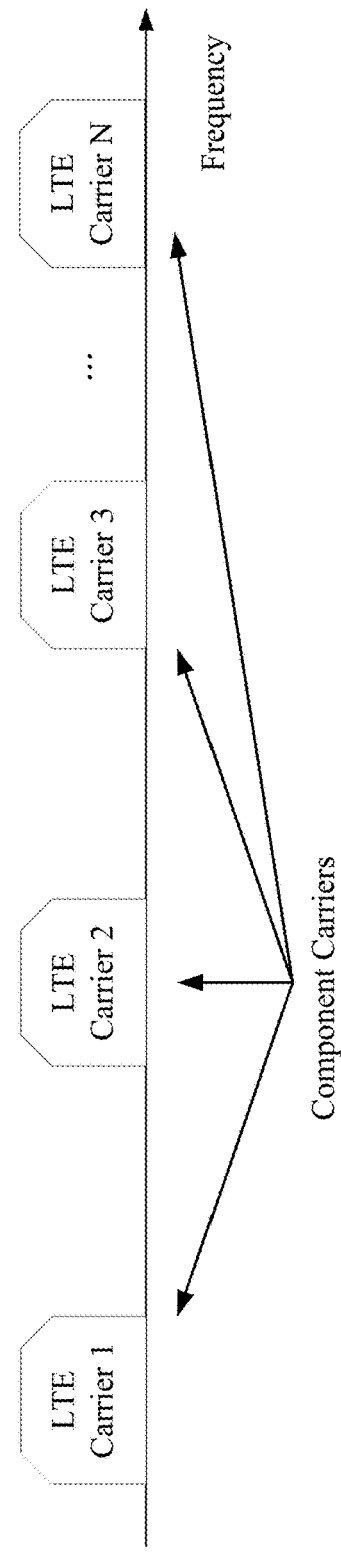

CONFIGURABLE THRESHOLD FOR FORMAT SELECTION FOR ENHANCED CARRIER AGGREGATION

CROSS-REFERENCE TO RELATED APPLICATION(S)

This application claims the benefit of U.S. Provisional Application Ser. No. 62/200,569, entitled "CONFIGURABLE THRESHOLD FOR PHYSICAL UPLINK CONTROL CHANNEL FORMAT SELECTION FOR ENHANCED CARRIER AGGREGATION" and filed on Aug. 3, 2015, which is expressly incorporated by reference herein in its entirety.

BACKGROUND

Field

The present disclosure relates generally to communication systems, and more particularly, to configurable threshold format selection for enhanced carrier aggregation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

A user equipment (UE) may use different formats for transmission of uplink control information (UCI). The formats for transmission of UCI have associated tradeoffs. For example, the different formats offer tradeoffs between performance for a UE and multiplexing capability for other UEs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. The summary's sole purpose is to present some concepts of one or more aspects in a simplified form as a prelude to the more detailed description that is presented later.

Different formats offer tradeoffs between performance for a UE and multiplexing capability for a group of UEs. For example, different physical uplink control channel (PUCCH) formats offer tradeoffs between PUCCH performance for a UE and PUCCH multiplexing capability for multiple UEs served by a base station.

In some examples, the tradeoff of individual PUCCH performance (e.g., UE power consumption) and PUCCH multiplexing in an evolved Node B (eNB) should take into account each individual UE's channel/interference conditions. For UEs with good channel conditions, slightly worse PUCCH performance with a PUCCH format offering larger multiplexing capability may be tolerable. A UE may need to transmit with higher transmit power to meet a PUCCH performance target. More UEs may then be multiplexed in a same resource block. Conversely, for UEs with bad channel conditions, PUCCH performance may become more important because the UE may experience power limitations that may compromise PUCCH performance, which may not be desirable. Accordingly, reduced multiplexing capability may be inevitable. Accordingly, a UE-specific threshold may be used in determining which PUCCH format to use for a particular PUCCH transmission.

In an aspect of the disclosure, a method, an apparatus, and a computer-readable medium storing computer executable code for wireless communication are provided. The apparatus determines a first threshold to apply in selecting a format from a plurality of formats. The format is used for a first transmission. Additionally, the first threshold to apply in the selection of the format is determined from a set of possible values. The apparatus determines a first size of a first payload for the first transmission and selects a first format for the first transmission based on the first size and the first threshold.

In an aspect of the disclosure, a method, an apparatus, and a computer-readable medium storing computer executable code for wireless communication are provided. The apparatus selects a first threshold to apply in selecting a format from a plurality of formats. The format is used for a first transmission by a UE. Additionally, the apparatus receives the first transmission from the UE, the first transmission using the selected threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A is a diagram illustrating an example of continuous carrier aggregation in accordance with the systems and methods described herein.

FIG. 4B is a diagram illustrating an example of non-continuous carrier aggregation in accordance with the systems and methods described herein.

DETAILED DESCRIPTION

Figure 1:
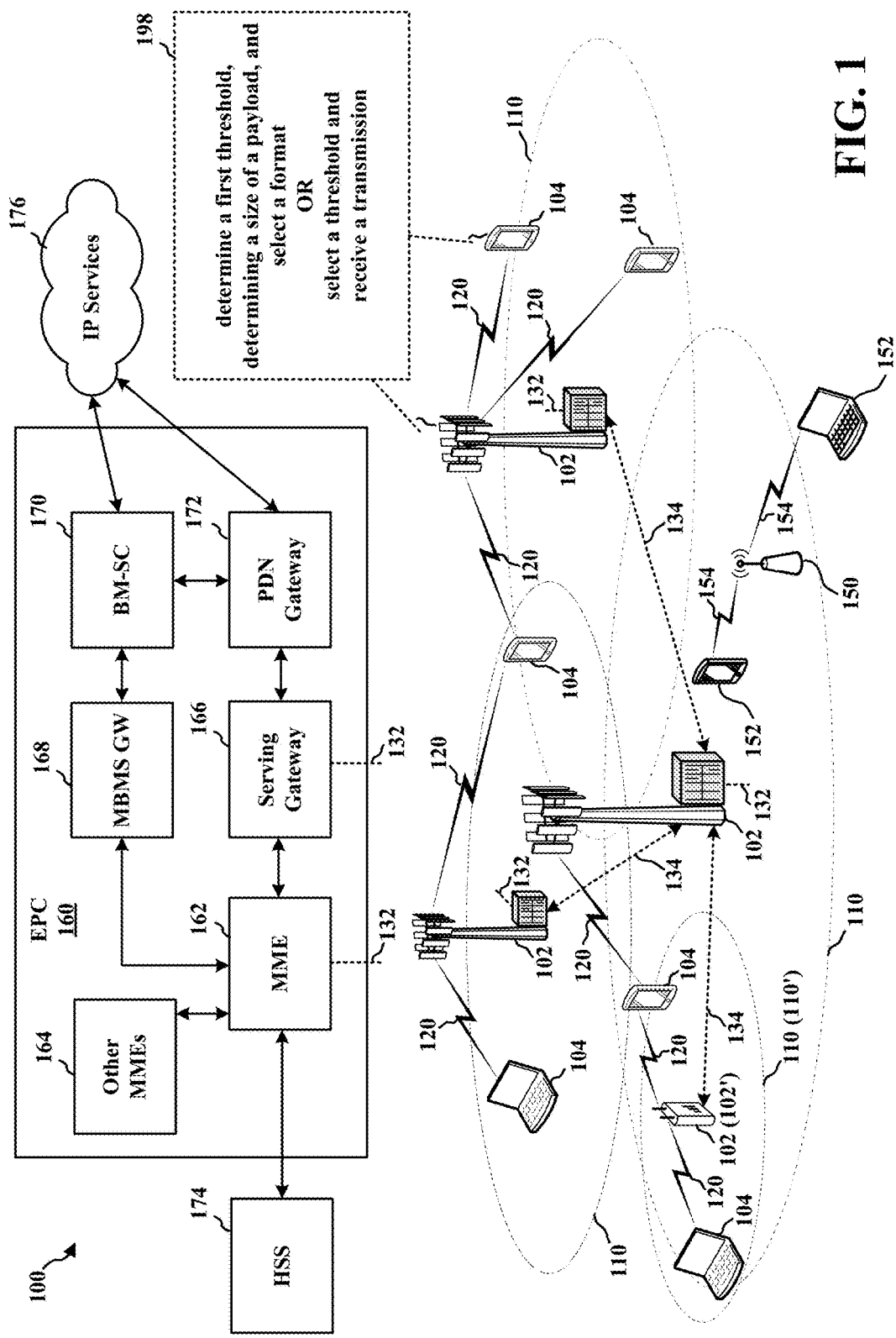
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. //stop The systems and methods described herein relate to wireless communication. These systems and methods further relate to selecting a format for a transmission of control information based on a size, e.g., payload size, and a threshold. The format may be related to the capacity of the transmission, e.g., the capacity may be in resource blocks. The threshold may be measured in a number of bits and applied to the payload size. Furthermore, the threshold may be determined from a set of values that may be a set of ranges of bits in payload size, e.g., 3 to 16 bits, 17 to 48 bits, 49 to 136 bits, to illustrate one example. The payload size, e.g., expressed in bits, may be a value that may be compared to the threshold. The threshold may be a set of thresholds, each threshold including ranges of values. Accordingly, the payload size may map to a format that may be assigned to a particular range of values in the set of thresholds. For example, when a payload size falls within a first range of bits, e.g., 3 to 16 bits, a first format may be used. When a payload size falls within a range of bits, e.g., 17 to 48 bits, a second format may be used. When a payload size falls within a third range of bits, e.g., 49 to 136 bits, a third format may be used. Accordingly, the threshold may be a set of thresholds, e.g., a set of values, where each set of values may form a set of ranges.

Additionally, different communication devices, e.g., different UEs, may have different thresholds (e.g., different sets of thresholds). A different set of thresholds may include different ranges of values. The payload size may again map to a format that may be assigned to a particular range of values in the set of thresholds. For example, for the second set of thresholds, when a payload size falls within a first range of bits, e.g., 3 to 24 bits, a first format may be used. When a payload size falls within a range of bits, e.g., 25 to 72 bits, a second format may be used. When a payload size falls within a third range of bits, e.g., 73 to 136 bits, a third format may be used. The formats selected using the second threshold may be different from the formats selected using the first threshold. Accordingly, different mappings of thresholds to formats may be used for different UEs.

Accordingly, one communication device may use the set of thresholds described in the example above while another communication device may use a different set of thresholds. For example, a second set of thresholds may be from 3 to 24 bits, from 25 to 72 bits, and from 73 to 136 bits. The other communication device may use the second set of thresholds to determine a format to use from a plurality of formats, where each range may be mapped to a particular format of the plurality of formats.

For example, where the plurality of formats are PUCCH formats, the ranges of bits may be used to determine the PUCCH format selected from the plurality of PUCCH formats, where each range may be mapped to a PUCCH format.

In an aspect, a communication device may determine a threshold to apply in selecting a format from a plurality of formats. The format may be used for an uplink transmission of control information. As discussed above, the format may be selected based a range of values in the set of thresholds. Additionally, the communication device may determine a size of a payload for the transmission. The communication device may then select the format for the transmission based on the size and the threshold. For example, the communication device may compare the size of the payload, e.g., in bits, to the threshold, e.g., the series of ranges of bits. Thus, if the size is 17 bits and the first set of ranges (or first set of thresholds) discussed above is used then, the 17-bit payload fits within the second range of bits of the first series of ranges (or first set of thresholds). On the other hand, if the size is 17 bits and the second set of ranges discussed above is used, then the 17-bit payload fits within the first range of bits of the second series of ranges (or second set of thresholds).

In some examples, a different set of thresholds may be applied to a different transmission, e.g., by another UE. For example, a second UE may determine a second size of a payload for a second transmission of control information. The second UE may select the second format for the second transmission based on the second size. For example, the second set of thresholds above might be selected for the payload of the second transmission of control information.

The systems and methods described herein may also be applied to a base station. For example, a base station may configure a threshold for a UE to apply in selecting a format from a plurality of formats. The format selected may be used for a transmission of control information by the UE. The base station may communicate the configuration to the UE. Accordingly, the base station may receive a transmission from the UE in accordance with the configured format. The transmission from the UE may use a format that is selected based on the thresholds provided by the base station.

Additionally, the base station may configure another threshold for a second UE to apply in selecting a second format to use for a second transmission of control information. The base station may communicate the configuration and thresholds to the second UE. Accordingly, the base station may receive a transmission from the second UE. The transmission from the second UE may be generated using the second format in accordance with the configuration of the second UE.

More specifically, the systems and methods described herein may be described with respect to the selection of a PUCCH format, as one example of formats that may be selected using the systems and methods described herein. The systems and methods described herein may be applied to the selection of other types of formats used within wireless communication systems, such as systems that have UEs and base stations.

By way of illustration and not limitation the systems and methods described herein for selecting a format, e.g., a PUCCH format by a communication device will be described with respect to a UE. The UE may determine a threshold to apply to selecting a PUCCH format from a plurality of PUCCH formats. The PUCCH format may be used for transmission of control information on the PUCCH. The threshold may be applied in the selection of the PUCCH format. The threshold may be a plurality of thresholds which are a set of values defining ranges of payload sizes that may be assigned to particular PUCCH formats. Additionally, the UE may determine a size of a payload for the transmission of control information. The UE may then select the PUCCH format for the transmission based on the size and the threshold. For example, the UE may compare the size of the payload, e.g., in bits, to the set of thresholds, e.g., a set of ranges of bits. Thus, if the size of the transmission is 17 bits and the first set of thresholds discussed above is used, then the 17-bit payload falls within the second range of bits of the first set of thresholds. On the other hand, if the size of the transmission is 17 bits and the second set of thresholds discussed above is used, then the 17-bit payload falls within the first threshold range of bits within the second set of thresholds. In some examples, different sets of ranges may be applied to different transmissions, e.g., by another UE. For example, a second UE may determine a second size of the payload for that UE's transmission. The second UE may select a PUCCH format for the transmission of control information based on the second size. For example, the second set of thresholds above might be selected based on the payload of the second transmission of control information. The systems and methods described herein may also be applied to a base station in selecting a format for a transmission.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to, and/or increase capacity of, the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, eNB, an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be an LTE user equipment. With LTE, control information sent by a UE may include HARQ feedback, channel state information (CSI), a scheduling request (SR), etc. The UE 104 may send UCI on the PUCCH. As an example of carrier aggregation, one uplink carrier may be designated as a primary cell (Pcell) on which the UE 104 sends UCI to the network. With dual-connectivity, a second PUCCH-enabled carrier (pScell) may also be configured and the configured carriers may be arranged into groups for the purpose of sending UCI on PUCCH of a respective cell. In each case, UE 104 may signal its UCI to the network using one of plurality of PUCCH formats.

According to the present disclosure, UE 104 may be configured to determine a first threshold to apply in selecting a format from a plurality of formats. The format may be used by the UE for a first transmission of control information on an uplink carrier. The first threshold may be applied in the selection of the format. The first threshold may be determined from a first set of values. The UE 104 may determine a first size of a first payload for the first transmission of control information. Additionally, the UE 104 may select a first format for the first transmission of control information based on the first size and the first threshold. The UE 104 may send the first transmission on an uplink carrier in accordance with the first format.

Referring again to FIG. 1, in certain aspects, the eNB 102 may be configured to determine a first threshold for use by a UE in selecting a format from a plurality of formats. The base station may communicate the threshold to a UE. The format may be used for a first transmission by the UE. The eNB may receive the first transmission of control information from the UE. The first transmission of control information may use the format selected by the UE according to the threshold. (198).

Figure 2:
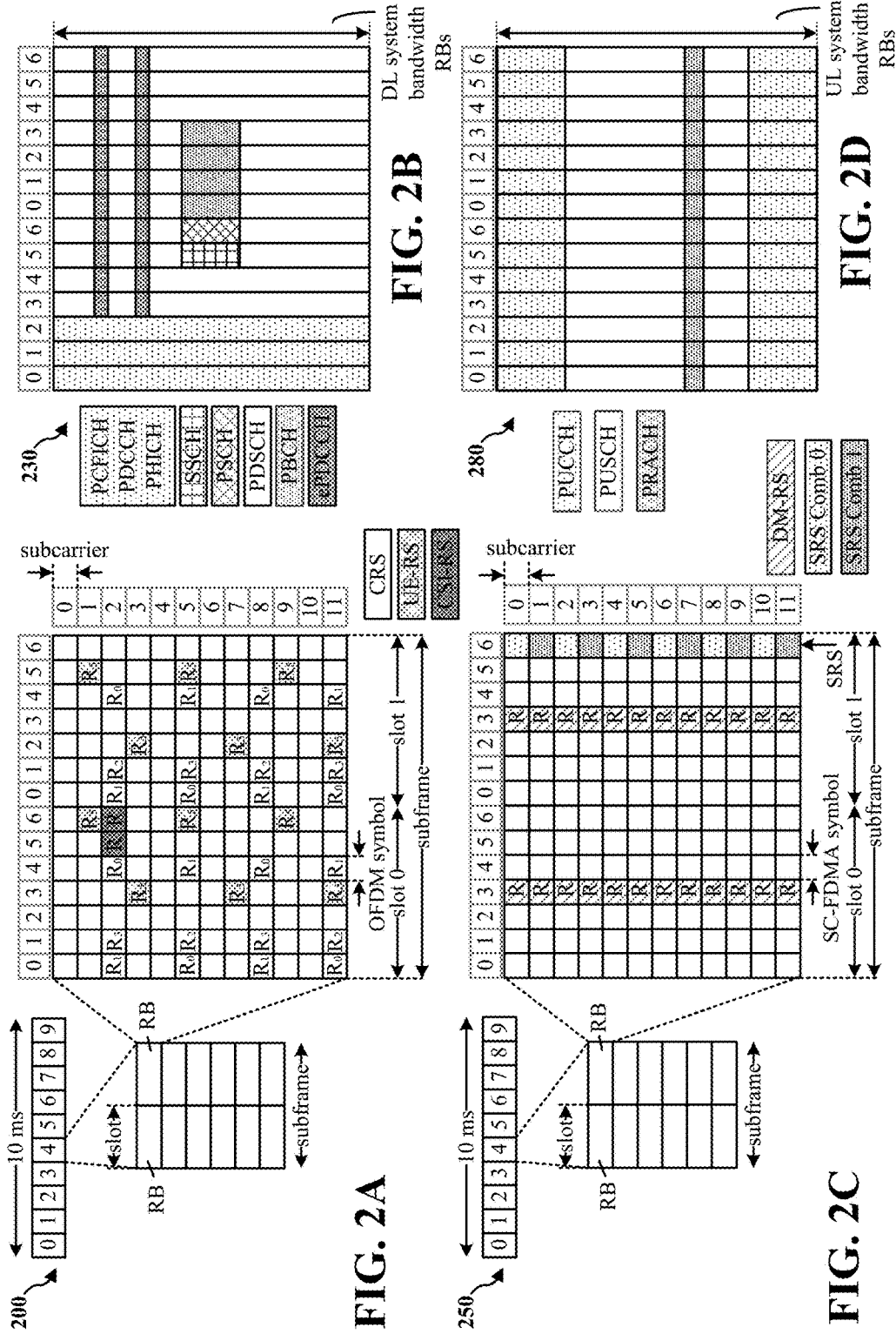
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A PUCCH may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
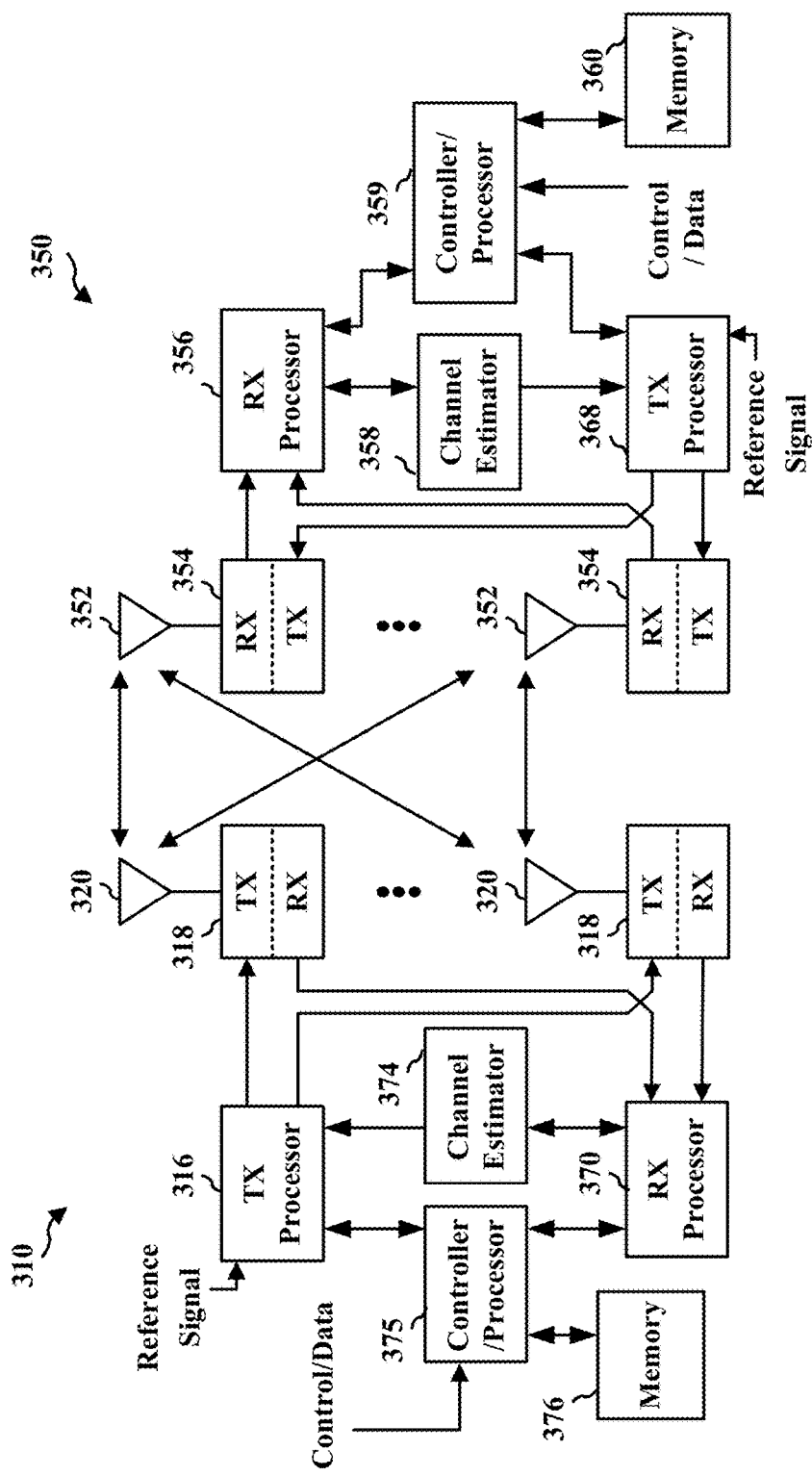
FIG. 3 is a diagram illustrating an example of an eNB and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through a respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Carrier Aggregation

UEs may use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments conserve spectrum and are a good fit for the typically asymmetric bandwidth utilization by broadband subscribers.

Carrier Aggregation Types

There are two types of carrier aggregation (CA) methods, continuous CA, and non-continuous CA. The two types of CA methods are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single UE.

In carrier aggregation (CA), a UE may be configured with up to 5 component carriers (CCs). Each of the CCs may be backward compatible. The bandwidth of each CC may be up to 20 MHz. Because a UE can be configured with up to 5 CCs in CA, up to 100 MHz can be configured for the UE.

The aggregated CCs may be all configured for FDD, or may be all configured for TDD. Alternatively, the aggregated CCs may be a mixture (e.g., combination) of at least one CC configured for FDD and at least one CC configured for TDD. Different CCs configured for TDD may have the same or different DL/UL configurations. Special subframes may be configured differently for different CCs configured for TDD.

Among the aggregated CCs, one CC is configured as the primary CC (PCC) for the UE. The PCC may be the only CC that carries a PUCCH and a common search space (CSS) for the UE. All other CCs are referred to as secondary CCs (SCCs).

A PUCCH may be enabled on two CCs in CA for a UE. For example, in addition to the PCC, one SCC could carry a PUCCH as well. This may help to address, for example, dual-connectivity and PUCCH load balancing needs.

In some cases, cells (CCs) may not have ideal backhaul (e.g., connections between eNBs), and, consequently, tight coordination between the cells may not be possible due to limited backhaul capacity and non-negligible backhaul latency (tens of milliseconds). Dual-connectivity addresses these issues.

In dual-connectivity, cells are partitioned into two groups. The two groups are the primary cell group (PCG) and the secondary cell group (SCG). Each group may have one or more cells in CA. Each group has a single cell that carries a PUCCH. In the PCG, a primary cell carries a PUCCH for the PCG. In the SCG, a secondary cell carries a PUCCH for the SCG. This secondary cell may be referred to also as the pScell.

Uplink control information (UCI) is separately conveyed to each group via the PUCCH associated with each group. A common search space may be monitored in the SCG by a UE. Semi-persistent scheduling (SPS) (or semi-static scheduling) and scheduling request (SR) may be supported in the SCG as well.

There is a need for increasing the number of CCs beyond five to provide higher bandwidth and increased data rates. This may be referred to herein as enhanced CA, according to which a UE may be configured with more than five CCs (e.g., between six and 32 CCs) for CA. Enhanced CA may require development of physical layer specifications for PUCCH on an SCell, and mechanisms to enable LTE CA for an increased number of CCs for the DL and the UL, e.g., 32 CCs for the DL and the UL may be specified. The mechanisms may include enhancements to DL control signaling for the increased number of CCs, possibly including both self-scheduling and cross-carrier scheduling. The mechanisms may include enhancements to UL control signaling for the number of CCs greater than five. The enhancements discussed above may include enhancements to support UCI feedback on the PUCCH for the increased number of DL carriers. For example, the enhancements may relate to UCI signaling formats to support UCI feedback for more than five DL carriers. The mechanisms may also include enhancements to support UCI feedback on the PUSCH for more than five DL carriers.

Various approaches for enhanced CA UCI feedback are proposed. According to one approach, UCI feedback for more than five DL carriers (e.g., up to 32 DL carriers) may be carried on the PUCCH of the primary cell (Pcell). Also, UCI feedback for more than five DL carriers (e.g., up to 32 DL carriers) may be carried on the PUSCH of one cell. This approach may be applicable whether or not UL CA is configured for UL CA capable devices (e.g., UL CA capable UEs). This approach may also be applicable for non-UL CA capable devices (e.g., non-UL CA capable UEs).

According to another approach, two or more PUCCH cell groups may be configured for more than five DL carriers (e.g., up to 32 DL carriers). For example, each of the DL carriers may be associated with one of the PUCCH cell groups.

When two or more PUCCH cell groups are configured, the transmission of the PUCCH for each cell group may be independently managed across the PUCCH cell groups. Aspects of the transmission of the PUCCH that are independently managed may include: determination of DL HARQ-ACK timing; PUCCH resource determination for carrying HARQ-ACK and/or CSI; higher-layer configuration of transmission (e.g., a combined transmission) of HARQ-ACK+CSI on the PUCCH; and higher-layer configuration of transmission of HARQ-ACK+SRS (sounding reference signal) in one subframe.

Aspects of the disclosure are directed to the management or handling of UCI (e.g., HARQ ACK/NAK and CSI) on the PUCCH in enhanced CA.

UCI feedback may be provided via any of several PUCCH formats. The UCI may include HARQ ACK/NAK, CSI and/or SR. Each of the PUCCH formats may support a corresponding combination of UCI.

For example, the PUCCH formats 1/1a/1b may primarily support HARQ ACK/NAK and/or SR. As another example, the PUCCH formats 2/2a/2b may primarily support CSI and/or HARQ ACK/NAK. As another example, the PUCCH format 3 may support HARQ ACK/NAK, as well as CSI and/or SR.

Simultaneous transmission of HARQ ACK/NAK and CSI on the PUCCH may be enabled by UE-specific higher layer signaling. For example, a UE may be configured via an RRC parameter to multiplex ACK/NAK and CSI on the PUCCH according to PUCCH format 2/2a/2b. As another example, a UE may be configured via an RRC parameter to multiplex ACK/NAK and CSI on the PUCCH according to PUCCH format 3.

According to PUCCH format 3, ACK/NAK and CSI (and/or SR) may be jointly coded and mapped onto a common set of resources. Accordingly, bits of ACK/NAK feedback and bits of CSI are treated equally with respect to transmission of the ACK/NAK feedback and the CSI.

A UE may report periodic CSI and/or aperiodic CSI. Types of CSI may include a rank indicator (RI), a precoding matrix indicator (PMI), a precoding type indicator (PTI), a wideband channel quality indicator (CQI) and a subband CQI.

With respect to periodic CSI, some types of CSI may be jointly coded and transmitted together. For example, RI and PTI may be jointly coded. As another example, PMI and wideband CQI may be jointly coded.

Two or more types of periodic CSI corresponding to a single CC may collide when being scheduled for transmission. For example, the two or more types of periodic CSI may all be scheduled for transmission in the same subframe. In such a situation, not all of the periodic CSI may be transmitted. For example, only one type of periodic CSI may be transmitted.

The type of CSI that is transmitted when a collision occurs may be based on a level of priority or ranking of the type of CSI. For example, RI/PTI may rank above CQI. Accordingly, if RI/PTI and CQI collide in a subframe, the RI/PTI may be transmitted while the CQI is dropped (e.g., not transmitted). According to various aspects, the types of CSI may be ranked, in decreasing order of priority, as follows: RI/PTI, PMI, wideband CQI, subband CQI.

Periodic CSI corresponding to two or more CCs may collide in a subframe. In such a situation, not all of the periodic CSI may be transmitted. For example, periodic CSI for only one CC may be transmitted, while periodic CSI for the other CC(s) is dropped.

The CC for which periodic CSI is transmitted may be based on a level of priority or ranking for the periodic CSI. As noted earlier, CSI may be ranked, in decreasing order of priority, as follows: RI/PTI, PMI, wideband CQI, subband CQI. Accordingly, if RI/PTI for a first CC and CQI for a second CC collide in a subframe, the periodic CSI (e.g., RI/PTI) for the first CC may be transmitted, while the periodic CSI (e.g., CQI) for the second CC may be dropped.

If the colliding periodic CSI corresponding to two or more CCs is of a same type, then the CC for which periodic CSI is transmitted may be based on the corresponding cell IDs of the CCs. For example, a CC with a lower cell ID may be given priority over another CC with a higher cell ID, or alternatively, a CC with a higher cell ID may be given priority over another CC with a lower cell ID. Accordingly, if RI/PTI for a first CC and RI/PTI for a second CC collide in a subframe, then the CC for which periodic CSI is transmitted may be based on the cell IDs of the first and second CCs. If the cell ID of the first CC is lower than the cell ID of the second CC, then the periodic CSI (e.g., RI/PTI) for the first CC may be transmitted, while the periodic CSI (e.g., RI/PTI) for the second CC may be dropped.

With respect to aperiodic CSI, CSI of multiple CCs and/or multiple types may be jointly coded and transmitted on the PUSCH. For example, CQI/PMI for multiple carriers may be jointly coded. Also, resource mapping for the CQI/PMI may be performed in a joint manner. RI/PTI may be jointly coded separately from the coding of the CQI/PMI. Also, resource mapping for the RI/PTI may be performed in a joint manner separately from the resource mapping for the CQI/PMI.

ACK/NAK may be used to provide feedback regarding data that is received via one or more CCs. As noted earlier, there is a need for increasing the number of CCs beyond five to provide higher bandwidth and increased data rates. When a larger number of CCs is configured for a UE, the UE may need to send a large number of bits of ACK/NAK information. Depending on the number of configured CCs, the number of ACK/NAK bits may be on the order of 100 bits (e.g., 100 bits or more).

When a larger number of CCs is configured, the number of CCs for which periodic CSI is dropped may also increase. As described earlier, not all of the periodic CSI corresponding to two or more CCs may be transmitted when the periodic CSI collide in a same subframe. This situation may become more problematic when a larger number of CCs is configured. For example, if periodic CSI for one CC may be transmitted in a single subframe, the number of CCs for which periodic CSI is dropped may increase when a larger number of CCs is configured (and activated). The situation may become more noticeable in the realm of TDD systems, in which the number of available uplink subframes per frame may be limited.

Aspects of the disclosure are directed to one or more additional PUCCH formats. The one or more additional PUCCH formats may be different from PUCCH formats that were noted earlier (e.g., PUCCH format 1/1a/1b, PUCCH format 2/2a/2b, PUCCH format 3). For example, the one or more additional PUCCH formats may be better suited to handle a larger ACK/NAK payload (e.g., a payload of around 100 bits or more). Further, the one or more additional PUCCH formats may be better suited to handle multiplexing of periodic CSI and/or SR, e.g., for two more CCs. For example, the one or more additional PUCCH formats may support transmission of periodic CSI for two or more CCs in a single subframe.

The one or more additional PUCCH formats may support a larger payload for ACK/NAK as well as a larger payload for periodic CSI. In such a situation, joint coding of ACK/NAK and CSI (e.g., the joint coding performed according to PUCCH format 3) may not be efficient because the ACK/NAK may have a different performance target than the performance target for the CSI. Accordingly, to meet both performance targets using joint coding, both the ACK/NAK and the CSI would need to meet the higher performance target of the two performance targets. For example, assume ACK/NAK and CSI may each be associated with a different performance target. For example, a 4% error rate for CSI may be acceptable, while a 0.1% error rate for ACK/NAK may be acceptable. Joint coding of ACK/NAK and CSI may require that both the ACK/NAK and CSI meet a 0.1% error rate. Accordingly, with joint encoding, the CSI error rate is much lower than required. The joint coding of ACK/NAK and CSI may not explicitly differentiate the ACK/NAK and the CSI from each other, and may not specifically address the ACK/NAK or CSI's respective performance targets. While joint coding may be acceptable for smaller ACK/NAK and CSI payloads (e.g., payloads on the order of 10 bits), joint coding may introduce additional complexity when larger ACK/NAK and CSI payloads (e.g., payloads on the order of 100 bits) are involved.

According to aspects of the disclosure, separate encoding of the ACK/NAK and the CSI may be performed. For example, the encoding of the ACK/NAK may be performed separately from the encoding of the CSI. Alternatively (or in addition), separate resource mapping for the ACK/NAK and the CSI may be performed. For example, the resource mapping for the ACK/NAK may be performed separately from the resource mapping for the CSI.

The separate encoding/resource mapping may be performed in a manner similar to the manner in which different types of aperiodic CSI are handled on PUSCH. For example—as noted earlier with respect to aperiodic CSI on PUSCH, CQI/PMI may be jointly coded, and, distinct from the coding of the CQI/PMI, RI/PTI may be jointly coded.

According to one aspect, separate coding and/or separate resource mapping may be performed in order to send different types of UCI on the PUCCH. As noted earlier, the different types of UCI may include ACK/NAK and various types of CSI (e.g., CQI, PMI, PTI, and RI). According to particular aspects, coding/resource mapping for ACK/NAK may be performed separately from coding/resource mapping for the CSI.

Figure 5:
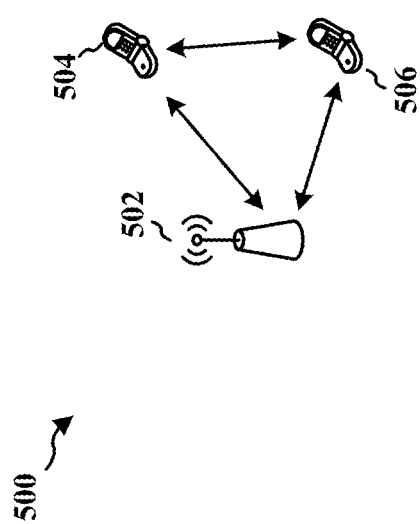
FIG. 5 is a diagram illustrating an example communication system in accordance with the systems and methods described herein.

FIG. 5 is a diagram illustrating an example communications system 500 in accordance with the systems and methods described herein. The communication system 500 includes a base station 502 (e.g., eNB) and two UEs 504, 506.

In some examples, the UE 504, 506 determines a first threshold to apply in selecting a PUCCH format from a plurality of PUCCH formats. The PUCCH format may be used for a first PUCCH transmission. The first threshold to apply in the selection of the PUCCH format may be determined from a set of possible values. The set of values may be a set of thresholds defining when one of a series of PUCCH formats will be used, such as the sets of values defined for UE 504 and UE 506 below.

The UE 504, 506 may determine a first size of a first payload for the first PUCCH transmission and select a first PUCCH format for the first PUCCH transmission based on the first size and the first threshold.

In another example, the base station 502 selects a first threshold to apply in selecting a PUCCH format from a plurality of PUCCH formats. The PUCCH format is used for a first PUCCH transmission by a UE 504, 506

The base station 502 receives the first PUCCH transmission from the UE 504, 506. Additionally, the first PUCCH transmission uses the selected threshold.

In various communication systems, there may be a tradeoff of individual PUCCH performance (hence UE 504, 506 power consumption) and PUCCH multiplexing in an eNB (base station 502) should take into account each individual UE's 504, 506 channel/interference conditions. For UEs 504, 506 with good channel conditions, slightly worse PUCCH performance with a PUCCH format offering larger multiplexing capability (e.g., PUCCH format 3 or PUCCH format 4) may be tolerable. The UE 504, 506 may need to transmit slightly larger transmit power to meet a PUCCH performance target which may enable more UEs 504, 506 to be multiplexed in a same RB.

For UEs 504, 506 with bad channel conditions, PUCCH performance may become more important because the UE 504, 506 may experience power limitations and hence the UE 504, 506 may experience compromised PUCCH performance. Compromised PUCCH performance may include PUCCH performance that is limited in some way. For example, PUCCH performance such as PUCCH capacity or PUCCH coverage may be interference limited due to a number of interfering signals. Generally, poor channel conditions may negatively impact PUCCH performance such as PUCCH capacity or PUCCH coverage decreasing PUCCH capacity, PUCCH coverage, or both. Compromised PUCCH performance is generally not desirable. Lower multiplexing capability may be traded for better PUCCH performance during bad channel conditions.

Accordingly, in some aspects, a UE-specific threshold may be used in determining which PUCCH format to use for a particular PUCCH transmission (at a particular UE 504, 506).

The following examples illustrate two possible sets of thresholds:

UE 504:
From 3-16 bits, PUCCH format 3
From 17-48 bits, PUCCH format 4
From 49-136 bits, PUCCH format 5
UE 506:
From 3-24 bits, PUCCH format 3
From 25-72 bits, PUCCH format 4
From 73-136 bits, PUCCH format 5

The example thresholds or other thresholds may be used in conjunction with the systems and methods described herein. The example thresholds (or other thresholds) provide an example comparison between ACK/NAK payloads (measured, e.g., in number of bits) and the thresholds (measured in number of bits) to determine PUCCH formats to use for subframes.

In some aspects, the ACK/NAK payload determination can be based on configured, activated, or detected CCs, and may also be based on an indication in a grant. Additionally, CSI and/or SR payload may also be used if CSI and/or SR are multiplexed with HARQ ACK/NAK on the PUCCH. In other aspects, the threshold may be sent via an RRC configuration that is UE specific. Additionally, if there are two or more PUCCH groups, each group may have the same or different thresholds As described above, the systems and methods described herein may be used in conjunction a base station, such as a base station 502. The base station 502 may configure the threshold for one or more of the UEs 504, 506 depending on the multiplexing needs and/or the PUCCH performance needs of the individual UE 504, 506 and/or groups of UEs.

The base station 502, e.g., the eNB, may determine which threshold(s) to use based on each UEs 504, 506 channel conditions. Channel conditions may be based on RSRP, CSI reporting, PHR (for a particular PUCCH group), or other measures of channel conditions at the UE level or for groups of UEs.

The base station 502, e.g., eNB, may also determine thresholds to be used based on the number of UEs 504, 506 in a cell. For example, if a few (e.g., three) UEs 504, 506 are located in a cell, the threshold may be selected to improve PUCCH performance in the cell. For example, in a cell with few UEs 504, 506, PUCCH performance may be the driving factor in determining the thresholds. Alternatively, if a large number of UEs 504, 506 use the PUCCH in a cell, PUCCH multiplexing capability may be the driving factor in determining the thresholds. What constitutes a "very limited number of UEs" and what constitutes "a larger number of UEs" may vary from system to system and may be based on the communication resources, e.g., communication bandwidth, available to the system. Accordingly, selection of numbers of UEs for a "very limited number of UEs" and numbers of UEs for "a larger number of UEs" may vary from system to system. For example, the definition of a large number of UEs may relate to the bandwidth in systems based on the number of UEs the bandwidth can support. For example, if a bandwidth for a given system is x and each UE uses $\frac{1}{10}$x in bandwidth, then 10 UEs might be considered "a larger number of UEs." On the other hands, is each UE uses $\frac{1}{100}$x, then 10 UEs might be considered a "very limited number of UEs." Furthermore, if each UE uses $\frac{1}{10}$x, but only 25% of the UEs are actually actively using bandwidth at a given time, then 10 UEs might still be considered a limited number of UEs.

Figure 6:
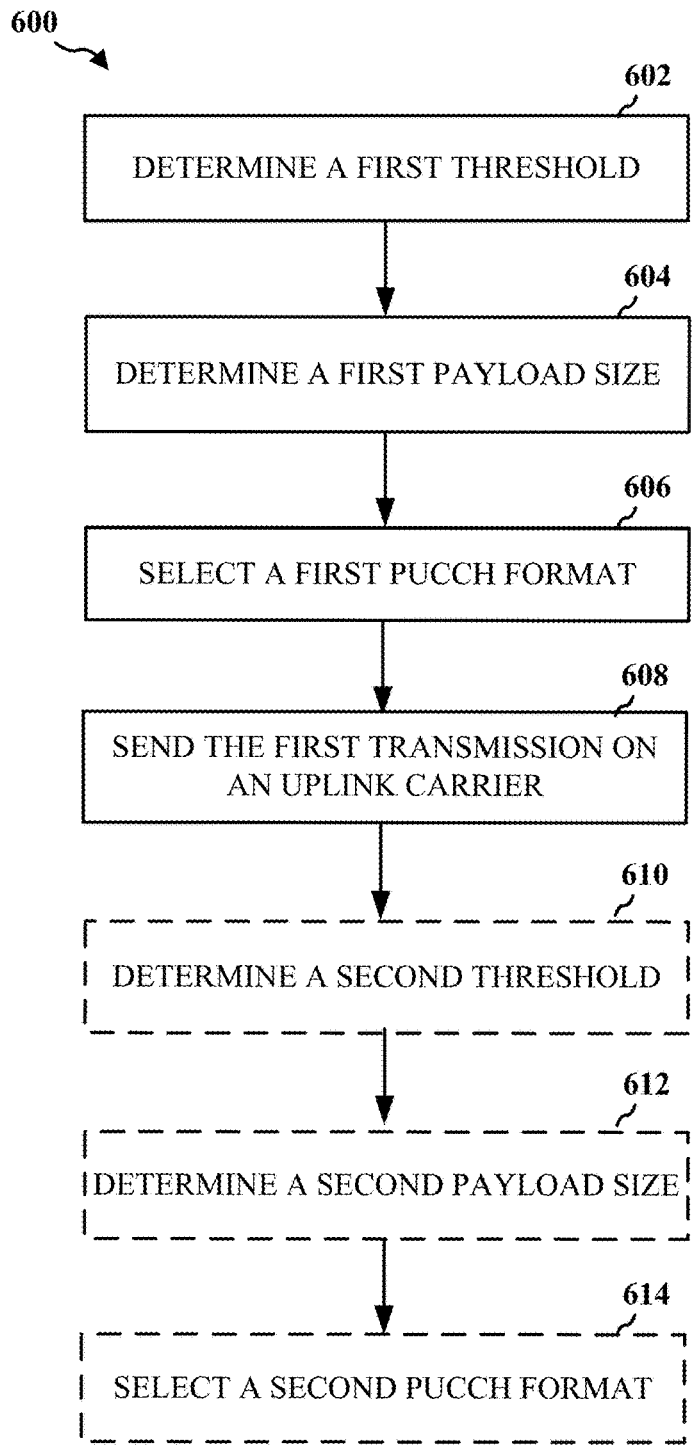
FIG. 6 is a flowchart of a method of wireless communication in accordance with the systems and methods described herein.

FIG. 6 is a flowchart 600 illustrating a method of wireless communication in accordance with the systems and methods described herein. At block 602, a UE, such as UE 104 of FIG. 1, UE 350 of FIG. 3, or UE 504, 506 of FIG. 5, determines a first threshold to apply in selecting a format from a plurality of formats, e.g., a PUCCH format from a plurality of PUCCH formats. For example, controller/processor 359, TX processor 368, RX processor 356, or other processing circuitry may determine a first threshold to apply in selecting a format used by a UE from a plurality of formats. The format may be used for a first transmission of control information. Additionally, the first threshold to apply in the selection of the format may be determined from a set of possible values. The set of values may be a set of configured thresholds defining when one of a series of formats will be used, such as set 1 and set 2, illustrated below.

In some examples, determining the first threshold may include determining the first threshold from a set of configured thresholds. For example, assume the format is a PUCCH format. For UEs with good channel conditions, slightly worse PUCCH performance with a PUCCH format offering larger multiplexing capability, such as PUCCH format 3 or PUCCH format 4 may be preferable. Accordingly, for good channel conditions, the UE 104 may be configured with a set of thresholds that favor PUCCH format 3 or PUCCH format 4. Conversely, for UEs experiencing bad channel conditions, PUCCH performance may be more important to avoid compromised PUCCH performance. Accordingly, for bad channel conditions, UE 104 may be configured with a set of thresholds that favor PUCCH format 5.

For good channel conditions, a threshold of up to 24 bits of payload size for format 3 may be preferred to a threshold of up to 16 bits of payload size for format 3, for example. Accordingly, between a first set of thresholds including up to 24 bits of payload size for format 3 and a second set of thresholds including up to 16 bits of payload size for format 3, for good channel conditions the first set of thresholds including the maximum threshold of 24 bits size for format 3 may be selected. In some aspects thresholds may be selected individually while in other aspects thresholds may be selected in sets.

For bad channel conditions, a threshold of up to 16 bits of payload size for format 3 may be preferred to a threshold with up to 24 bits of payload size for format 3, for example. Accordingly, between a first set of thresholds including up to 24 bits of payload size for format 3 and a second set of thresholds with up to 16 bits of payload size for format 3, for bad channel conditions the second set of thresholds with a threshold of up to 16 bits of payload size may be selected.

In certain aspects, the threshold(s) selected may be one of a series of thresholds, e.g., set 1 and set 2 listed below. Accordingly, ranges of payload bit sizes may be selected, including a number of individual thresholds. Thus, thresholds may be selected as entire sets of thresholds, including a number of thresholds. Thus, given the example sets of thresholds below, in good channel conditions, set 2 may be preferred. In bad channel conditions, set 1 may be preferred.

Set 1:
From 3-16 bits (payload size), PUCCH format 3
From 17-48 bits, PUCCH format 4
From 49-136 bits, PUCCH format 5
Set 2
From 3-24 bits, PUCCH format 3
From 25-72 bits, PUCCH format 4
From 73-136 bits, PUCCH format 5

In some examples, determining the first threshold includes receiving the first threshold (or set of thresholds), e.g., from a base station. Accordingly, the first threshold may be transmitted to the UE, as described herein. For example, in some aspects, the first threshold is received from a base station. In some examples, the first threshold is RRC configured. For example, receiving the first threshold may include receiving an RRC configuration message.

At block 604, the UE, e.g., UE 104, 350, 504, 506, determines a first size of a first payload for the first transmission. For example, controller/processor 359, TX processor 368, RX processor 356, or other processing circuitry may determine a first size of a first payload for the first transmission of control information. In some aspects, the ACK/NAK size determination may be a function of configured CCs, activated CCs, or detected CCs, and may be a function of an indication in a grant.

At block 606, the UE, e.g., UE 104, 350, 504, 506, selects a first format for the first transmission, e.g., a first PUCCH format for the first PUCCH transmission, based on the first size and the first threshold. For example, controller/processor 359, TX processor 368, RX processor 356, or other processing circuitry may select a first format for the first transmission of control information based on the first size and the first threshold.

At block 608, the UE, e.g., UE 104, 350, 504, 506, sends the first transmission on an uplink carrier in accordance with the first format. For example, controller/processor 359, TX processor 368, RX processor 356, or other processing circuitry may sends the first transmission on an uplink carrier in accordance with the first format.

At block 610, the UE, e.g., UE 104, 350, 504, 506, determines a second threshold to apply in selecting a format. For example, controller/processor 359, TX processor 368, RX processor 356, or other processing circuitry may determine a second threshold to apply in selecting a format, e.g., a PUCCH format. The format may be used for a second transmission, e.g., a second PUCCH transmission. The second threshold to apply in the selection of the format may be determined from the set of possible values.

At block 612, the UE, e.g., UE 104, 350, 504, 506, determines a second size of a second payload for a second transmission of control information. For example, controller/processor 359, TX processor 368, RX processor 356, or other processing circuitry may determine a second size of a second payload for a second transmission of control information.

At block 614, the UE, e.g., UE 104, 350, 504, 506, selects a second format based on the second size of the second payload and the second threshold for the second transmission of control information. For example, controller/processor 359, TX processor 368, RX processor 356, or other processing circuitry may select a second format, e.g., a second PUCCH format, based on the second size of the second payload and the second threshold for the second transmission, e.g., the second PUCCH transmission.

In some examples, the first threshold includes a set of thresholds defining when one of a series of formats, e.g., a series of PUCCH formats, will be used. In some examples, the payload includes at least one of a HARQ feedback, a channel state information feedback, or a scheduling request.

In some examples, each of the plurality of formats has a respective maximum payload size and a multiplexing capability. In some examples, at least one format of the plurality of formats uses time-domain spreading. Time domain spreading may be used to enhance communication throughput by providing redundant information. Generally, the time domain spreading approach to redundancy is to repeat information in multiple transmissions. Some formats may perform time-domain spreading using orthogonal (e.g., Walsh-Hadamard or DFT) spreading codes. In some examples, the first transmission, e.g., a PUCCH transmission, is transmitted in a first cell group of a plurality of cell groups.

In some examples, a second threshold is determined for a transmission in a second cell group, e.g., a PUCCH transmission in a second cell group. The second threshold may be different from the first threshold for the first cell group. In some examples, the plurality of the cell groups is part of a carrier aggregation operation configured for the UE. In some examples, the plurality of the cell groups is part of a dual connectivity operation configured for the UE.

Figure 7:
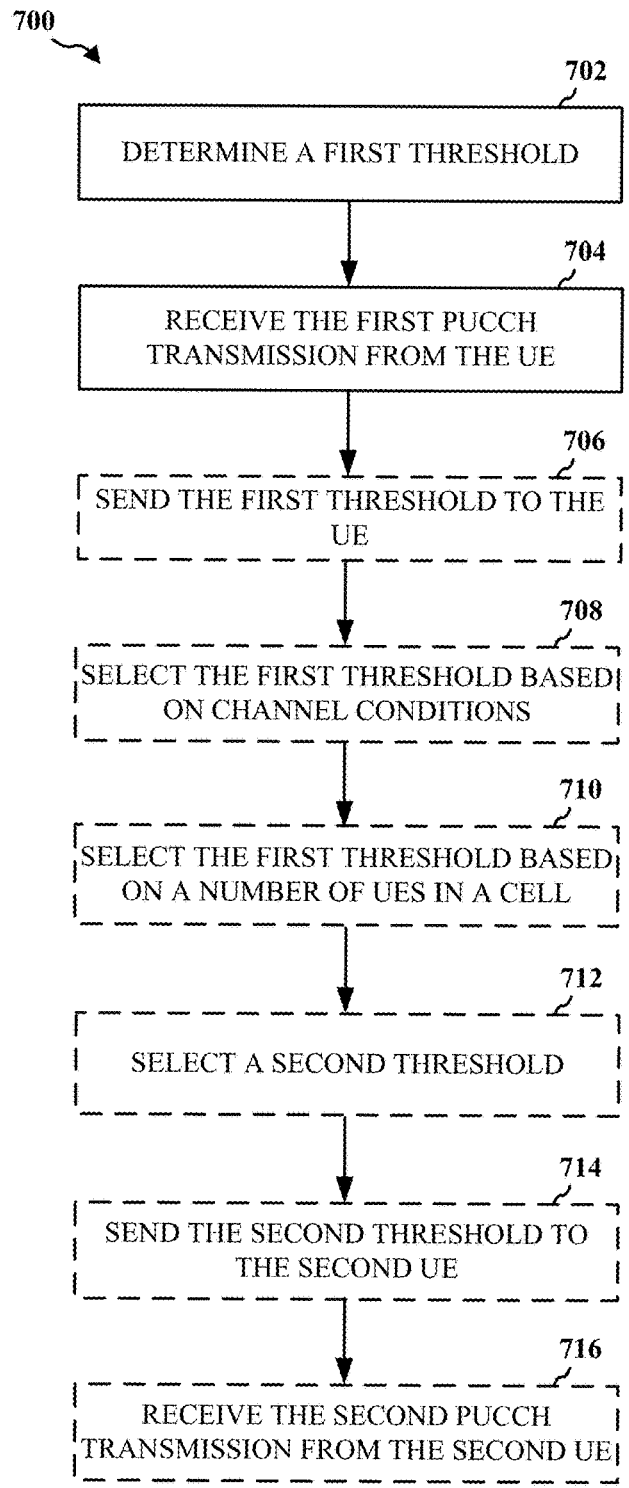
FIG. 7 is a flowchart of a method of wireless communication in accordance with the systems and methods described herein.

FIG. 7 is a flowchart 700 of a method of wireless communication in accordance with the systems and methods described herein. At block 702, an eNB, such as eNB 102 of FIG. 1, eNB 310 of FIG. 3, or base station 502 of FIG. 5 determines a first threshold with which to configured a UE 104 in selecting a format for transmission of uplink control information from a plurality of formats. The format used for a first transmission by a UE. For example, controller/processor 375, TX processor 315, RX processor 370, or other processing circuitry may determine a set of UE-specific thresholds and communicate them to UE 104 in an RRC configuration message.

At block 704, an eNB 102, 310 (or base station 502), receives the first transmission of control information from the UE, the first transmission using the selected threshold. For example, controller/processor 375, TX processor 315, RX processor 370, or other processing circuitry may receive the first transmission from the UE, the first transmission using the selected threshold.

At block 706, an eNB 102, 310 (or base station 502), sends the first threshold to the UE. For example, controller/processor 375, TX processor 315, RX processor 370, or other processing circuitry may send the first threshold to the UE. Sending the first threshold to the UE may include transmitting the first threshold to the UE. In another example, the first threshold is sent to the UE via a RRC configuration message. In another example, the first threshold may be preconfigured at the UE.

At block 708, an eNB 102, 310 (or base station 502), determines the first threshold based on channel conditions for the UE. For example, controller/processor 375, TX processor 315, RX processor 370, or other processing circuitry may select the first threshold based on channel conditions for the UE.

At block 710, an eNB 102, 310 (or base station 502), determines the first threshold based on a number of UEs in a cell including the UE. For example, controller/processor 375, TX processor 315, RX processor 370, or other processing circuitry may select the first threshold based on a number of UEs in a cell including the UE. The specific mapping between the number of UEs in a cell and a specific threshold may vary from implementation to implementation. Generally, the larger the number of UEs in a cell, the more important multiplexing may be. This may be particularly true when the format is a PUCCH format and a large number of UEs in a cell are using PUCCH. Accordingly, PUCCH formats 3 or 4 may be preferred when a larger number of UEs are in a cell (or a large number of UEs in the cell are using PUCCH). Conversely, PUCCH format 5 may be preferred when a small number of UEs are in the cell (or a small number of UEs in the cell are using PUCCH).

For example the threshold set 1 may be selected when the number of UEs in the cell is less than or equal to 5 and threshold set 2 may be selected when the number of UEs in the cell is greater than 5. Alternatively, in an aspect, multiple sets of thresholds for different numbers of UEs may be used, e.g., one set for up to 3 UEs, another set for 4 to 9 UEs, and a third set for 10 or more UEs. It will be understood, however, that the number of UEs for a particular threshold selection may vary depending on the particular communication system.

At block 712, an eNB 102, 310 (or base station 502), select a second threshold to apply in selecting a format. For example, controller/processor 375, TX processor 315, RX processor 370, or other processing circuitry may a second threshold to apply in selecting a format. The format may be used for a second transmission by a second UE.

At block 714, an eNB 102, 310 (or base station 502), send the second threshold to the second UE. For example, controller/processor 375, TX processor 315, RX processor 370, or other processing circuitry may send the second threshold to the second UE.

At block 716, an eNB 102, 310 (or base station 502), receives the second transmission from the second UE. For example, controller/processor 375, TX processor 315, RX processor 370, or other processing circuitry may receive the second transmission from the second UE.

In some examples, each of the plurality of formats has a respective maximum payload size and a multiplexing capability. In some examples, the selection of the format is based on a payload including at least one of a HARQ feedback, a channel state information feedback, or a scheduling request.

In some examples, at least one format of the plurality of formats has a time-domain spreading. In some examples, the channel conditions for the UE are determined based on at least one of Reference Signal Receive Power (RSRP), Channel State Information (CSI) reporting, or Power Headroom Report (PHR) for a group including the UE.

In some examples, the first threshold comprises a set of thresholds defining when one of a series of formats will be used. In some examples, the first transmission is received in a first cell group of a plurality of cell groups configured for the UE.

In some examples, a second threshold is determined for a transmission in a second cell group configured for the UE. The second threshold is different from the first threshold for the first cell group. In some examples, the second threshold comprises a set of thresholds defining when one of a series of formats will be used.

In some examples, the plurality of the cell groups is part of a carrier aggregation operation configured for the UE. In some examples, the plurality of the cell groups is part of a dual connectivity operation configured for the UE.

Figure 8:
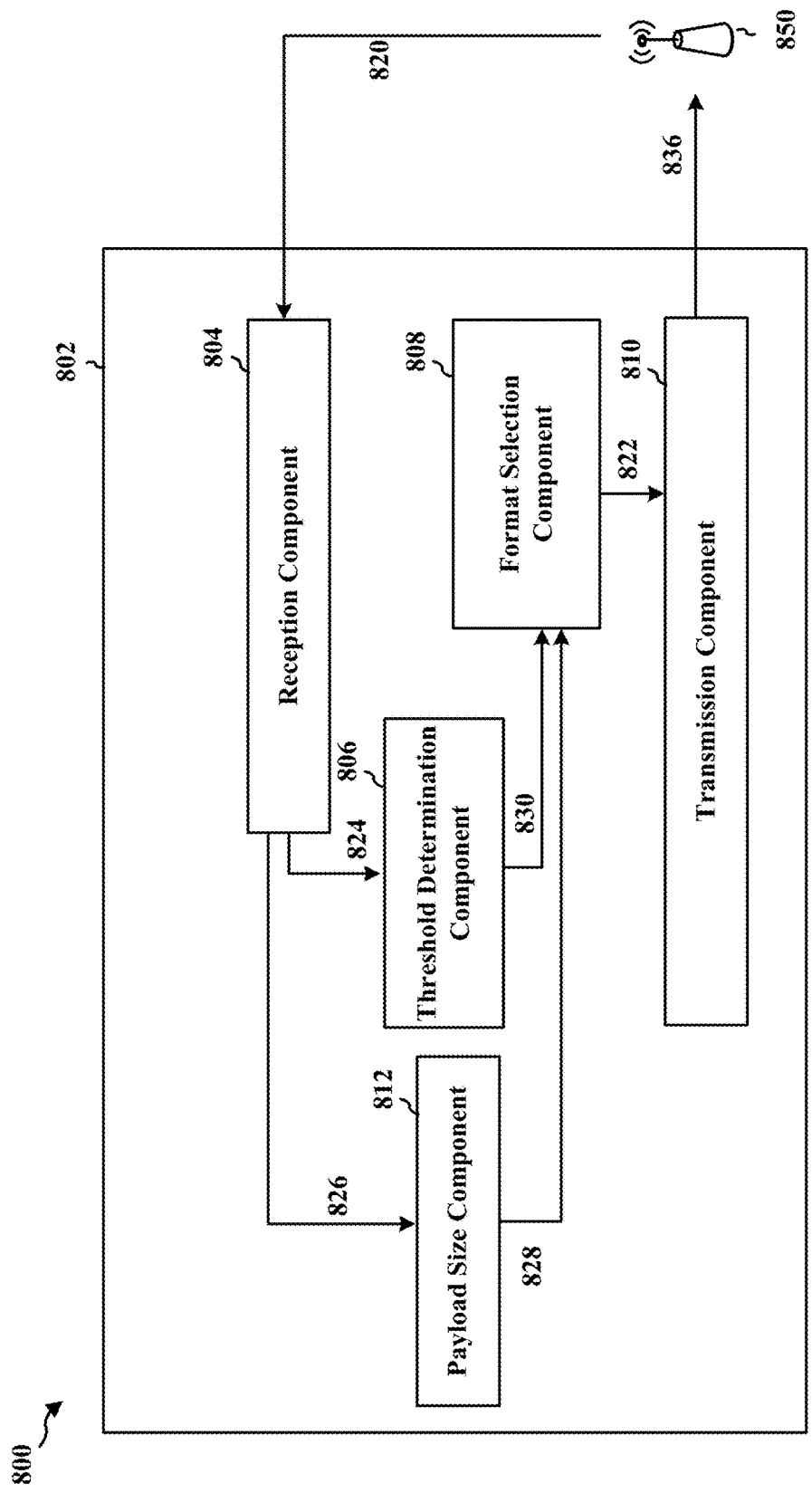
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a UE. The apparatus includes a reception component 804 that is configured to receive transmissions 820, a threshold determination component 806, that determines a threshold to apply in selecting a format from a plurality of formats, a format selection component 808 that selects a format for a transmission 836 based on a size and the threshold, a transmission component 810 that may transmit data, e.g., in the transmission 836, and a size component 812.

The apparatus may include additional components that perform each of the blocks of the algorithm in the aforementioned flowchart of FIG. 6. As such, each block in the aforementioned flowchart of FIG. 6 may be performed by a component and the apparatus may include one or more of the additional components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the threshold determination component 806 determines a first threshold to apply in selecting a format from a plurality of formats. The format may be used for a first transmission. The first threshold may be applied in the selection of the format and may be determined from a first set of values. The size component 812 determines a first size of a first payload for the first transmission, e.g., a transmission 820 received at the reception component 804 and transmitted 826 to the size component 812. The format selection component 808 selects a first format for the first transmission based on the first size 828 and the first threshold 830. The format selected may be communicated 822 to the transmission component 810 for transmission 836. Selection of a set of values that may form a series of thresholds used to select a format may be based on conditions for the UE using the set of values. For example if the UE has bad channel conditions, a set of values for the threshold may be selected that have fewer bits of payload size for the PUCCH formats. When channel conditions are good, thresholds, e.g., a set of values, with larger payload sizes for the PUCCH formats may be selected. Furthermore, as discussed above, different formats offer tradeoffs between performance for a UE and multiplexing capability for other UEs. The tradeoff of individual PUCCH performance (e.g., UE power consumption) and PUCCH multiplexing in an evolved Node B (eNB) should take into account each individual UE's channel/interference conditions. For UEs with good channel conditions, slightly worse PUCCH performance with a PUCCH format offering larger multiplexing capability may be tolerable. A UE may need to transmit with higher transmit power to meet a PUCCH performance target. More UEs may then be multiplexed in a same resource block. Conversely, for UEs with bad channel conditions, PUCCH performance may become more important because the UE may experience power limitations that may compromise PUCCH performance, which may not be desirable. Accordingly, reduced multiplexing capability may be inevitable. Accordingly, a UE-specific threshold may be used in determining which PUCCH format to use for a particular PUCCH transmission.

In one configuration, the format may include a PUCCH format.

In one configuration, determining the first threshold may include determining the first threshold from a set of thresholds configured for the UE. In another configuration, determining the first threshold may include receiving 824 the first threshold. In another configuration, the first threshold may be received 824 from a base station 850, e.g., through the reception component 804, which may receive the transmission 820 from the base station 850. In another configuration, the first threshold may be RRC configured. For example, receiving the first threshold may include receiving an RRC configuration message.

In one configuration, the size component 812 may determine a second size of a second payload for a second transmission (e.g., by the transmission component 810). The format selection component 808 may select a second format for the second transmission of control information based on the second size of the second payload and the first threshold.

In one configuration, the threshold determination component 806 may determine a second threshold to apply in selecting a format. The format may be used for a second transmission (e.g., by the transmission component 810). The second threshold may be applied in the selection of the format. The format may be determined from a second set of values, where the first set of values is different from the second set of values. The size component 812 may determine a second size of a second payload for a second transmission of control information. The format selection component 808 may select a second format based on the second size of the second payload and the second threshold for the second transmission of control information. For example, assuming set 1 above is the set of thresholds used, from 3-16 bits (payload size), PUCCH format 3 may be used; from 17-48 bits, PUCCH format 4 may be used; from 49-136 bits, PUCCH format 5 may be used. The size of the payload, e.g., in bits, may be compared to the set of thresholds. Comparing the size to each threshold may be done to determine which threshold is met. The format associated with the met threshold may then be selected. For example, for set 1, if a payload is 57 bits, PUCCH format 5 may be selected.

In one configuration, the first threshold may include a set of thresholds indicating when each format of a series of formats is used. In another configuration, the control information includes at least one of a HARQ feedback, a channel state information feedback, or a scheduling request. Generally, the size of the payload may be the number of bits used to convey the information in the payload.

In one configuration, each of the plurality of formats has at least one of a respective maximum payload size or a respective multiplexing capability. In another example, at least one format of the plurality of formats uses time-domain spreading. In another example, the transmission component 810 transmits to a first cell group of a plurality of cell groups.

In one configuration, the threshold determination component 806 determines a second threshold for a transmission in a second cell group. The second threshold may be different from the first threshold for the first cell group.

In one configuration, the plurality of the cell groups may be part of a carrier aggregation operation configured for the UE. In another configuration, the plurality of the cell groups may be part of a dual connectivity operation configured for the UE.

Figure 9:
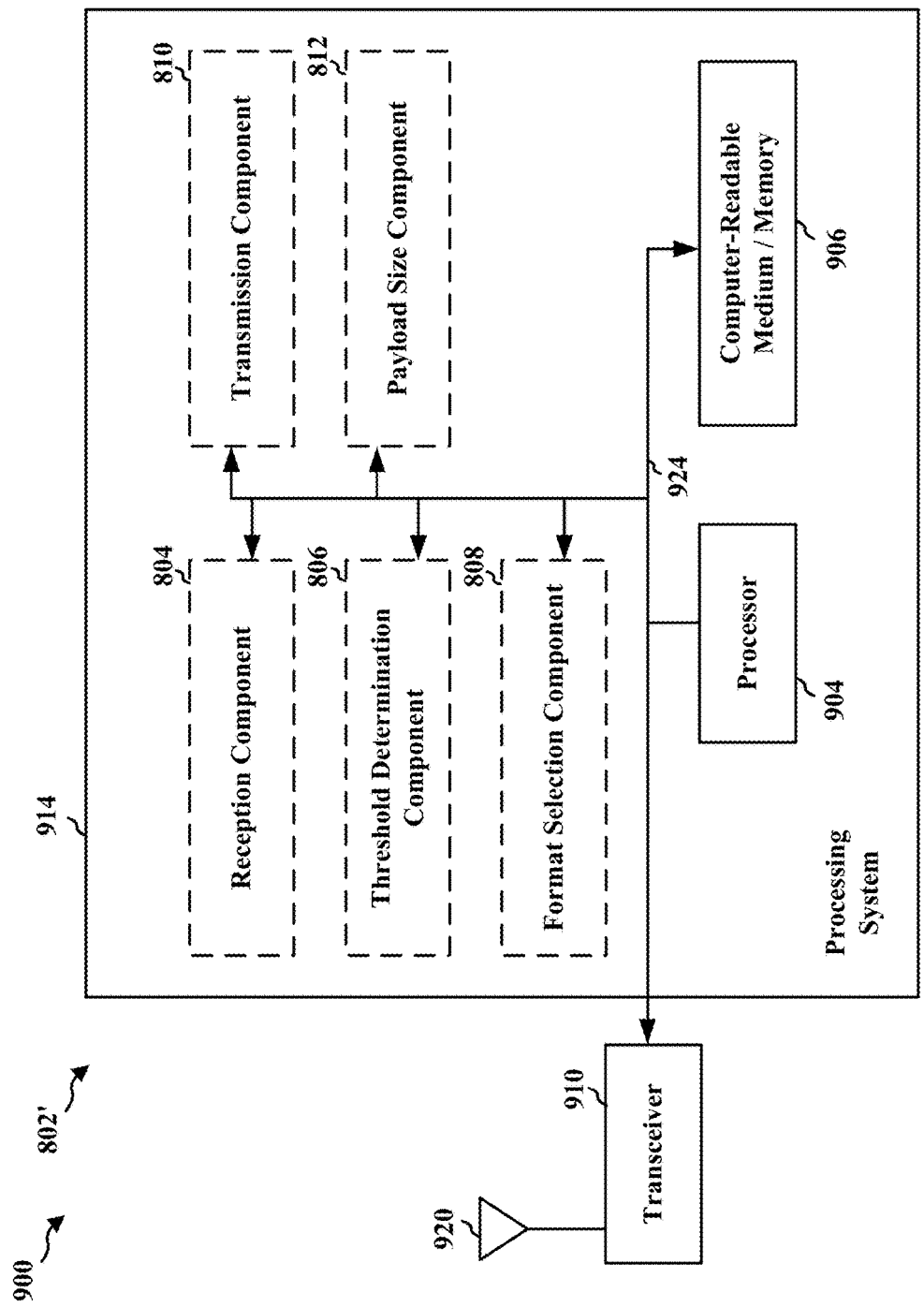
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 1004. In addition, the transceiver 910 receives information from the processing system 914, specifically the transmission component 1008, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for determining a first threshold to apply in selecting a format from a plurality of formats, the format used by the UE for a first transmission. The first threshold is applied in the selection of the format may be determined from a first set of values. The apparatus 802/802' for wireless communication includes means for determining a first size of a first payload for the first transmission of control information. The apparatus 802/802' for wireless communication includes means for selecting a first format for the first transmission of control information based on the first size and the first threshold. The apparatus 802/802' for wireless communication includes means for sending, by the UE, the first transmission on an uplink carrier in accordance with the first format.

The apparatus 802/802' for wireless communication may include means for determining a second size of a second payload for a second transmission of control information. The apparatus 802/802' for wireless communication may include means for selecting a second format for the second transmission of control information based on the second size of the second payload and the first threshold.

The apparatus 802/802' for wireless communication may include means for determining a second threshold to apply in selecting a format, the format used for a second transmission. The second threshold may be applied in the selection of the format is determined from a second set of values different from the first set of values. The apparatus 802/802' for wireless communication may include means for determining a second size of a second payload for a second transmission of control information. The apparatus 802/802' for wireless communication may include means for selecting a second format based on the second size of the second payload and the second threshold for the second transmission.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
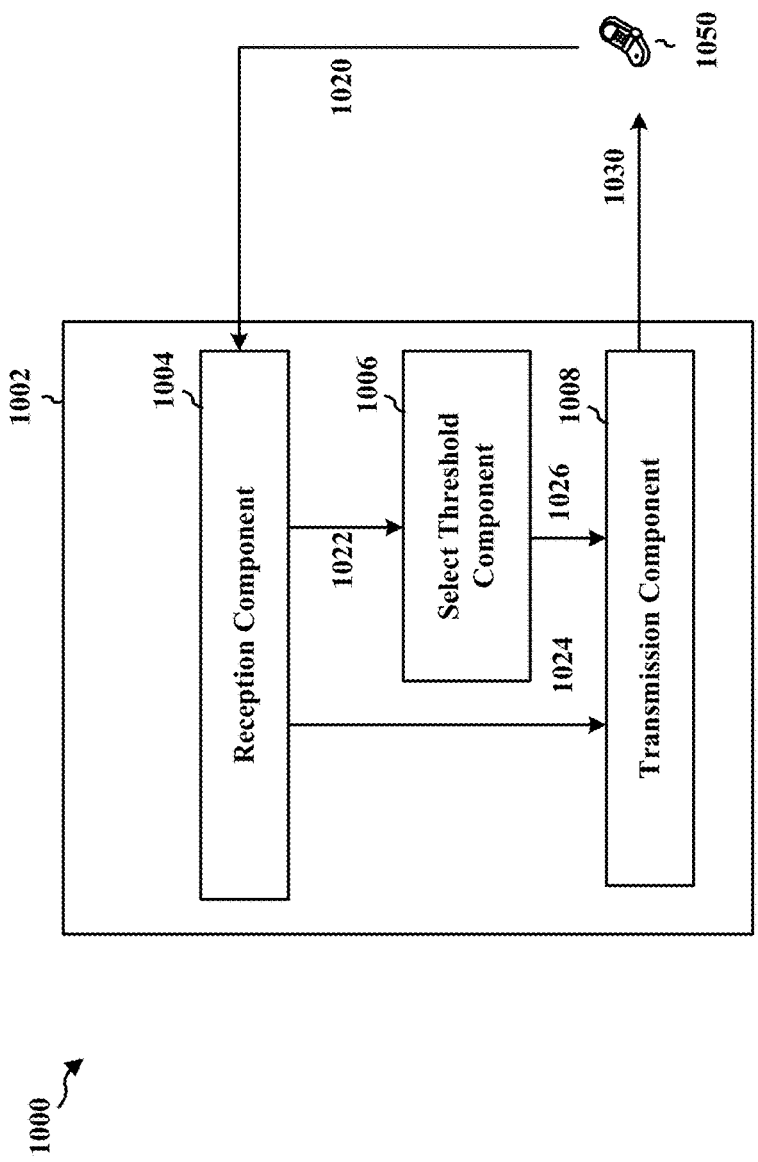
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be an eNB. The apparatus includes a reception component 1004 that is configured to receive message 1020 and a select threshold component 1006 that selects a threshold, and a transmission component 1008 that transmits 1030 data. The reception component 1004 may communicate 1024 data to be transmitted to the transmission component 1008.

The apparatus may include additional components that perform each of the blocks of the algorithm in the aforementioned flowchart of FIG. 7. As such, each block in the aforementioned flowcharts of FIG. 7 may be performed by a component and the apparatus may include one or more of the additional components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the select threshold component 1006 selects a first threshold to apply in selecting a format from a plurality of formats. The format is used for a first transmission by a UE 1050. The reception component 1004 receives the first transmission from the UE 1050, the first transmission using the selected threshold. The reception component 1004 may communicate 1022 information received that relates to the selection of a threshold with the select threshold component 1006.

In one configuration, the format may include a PUCCH format.

In one configuration, the transmission component 1008 may send the first threshold to the UE 1050. (The select threshold component 1006 may communicate 1026 the selected threshold to the transmission component 1008 for transmission 1030.) Sending the first threshold to the UE 1050 may include transmitting the first threshold to the UE 1050. In one configuration, the first threshold may be preconfigured at the UE. In one configuration, the first threshold may be sent to the UE 1050 via an RRC configuration message. In one configuration, the first threshold may be RRC configured. For example, receiving the first threshold may include receiving an RRC configuration message.

In one configuration, the first threshold may be a set of thresholds indicating when each format of a series of formats is used. In one configuration, the control information includes at least one of a HARQ feedback, a channel state information feedback, or a scheduling request. In one configuration, each of the plurality of formats has at least one of a respective maximum payload size or a respective multiplexing capability. In one configuration, at least one format of the plurality of formats uses time-domain spreading.

In one configuration, the first transmission may be transmitted in a first cell group of a plurality of cell groups. A second threshold may be determined for a transmission in a second cell group, wherein the second threshold is different from the first threshold for the first cell group.

In one configuration, the plurality of the cell groups may be part of a carrier aggregation operation configured for the UE 1050. In another configuration, the plurality of the cell groups are part of a dual connectivity operation configured for the UE 1050.

Figure 11:
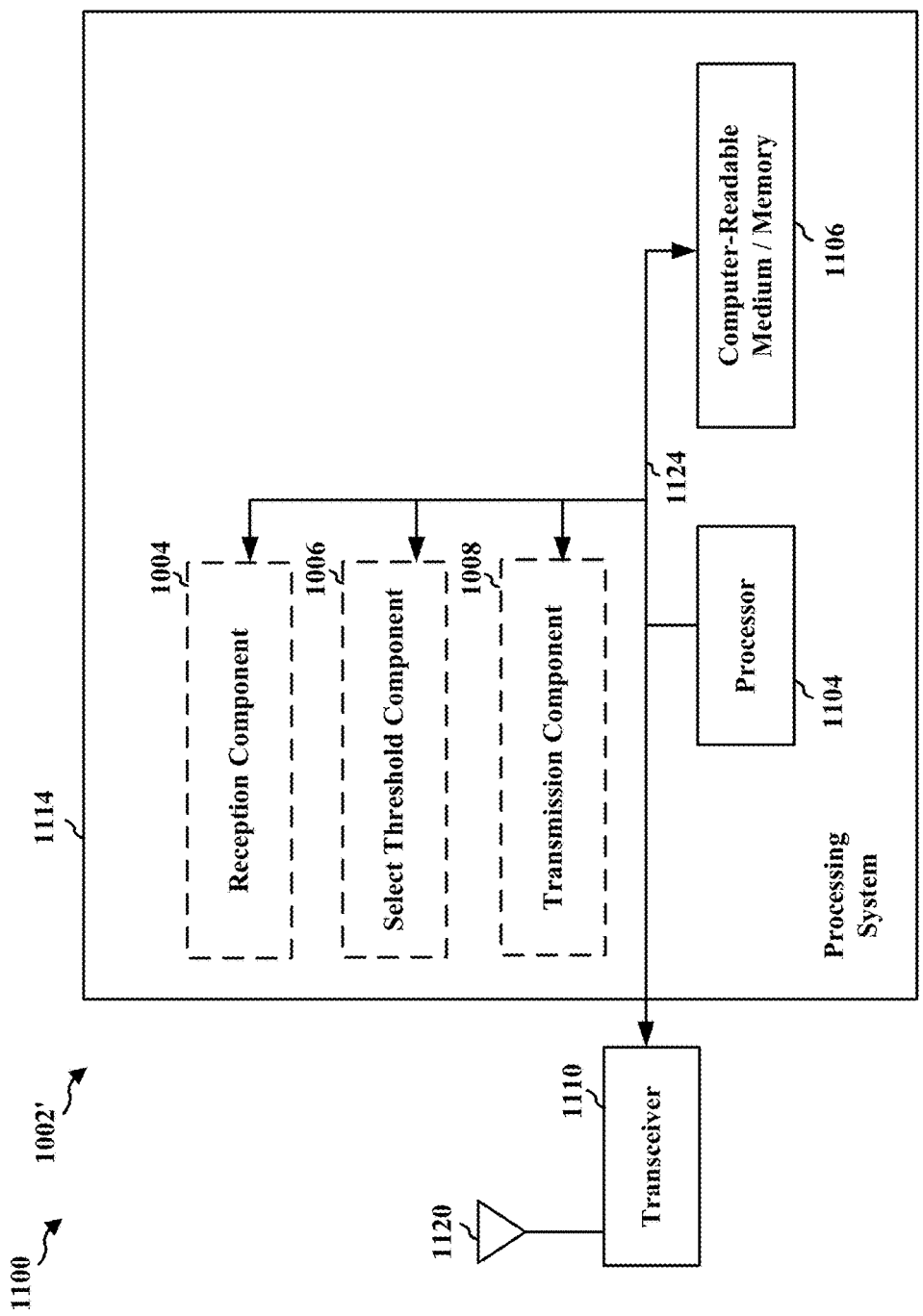
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1008, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375.

The apparatus 1002/1002' for wireless communication may include means determining a second size of a second payload for a second transmission of control information. The apparatus 1002/1002' for wireless communication may include means for selecting a second format for the second transmission based on the second size of the second payload and the first threshold.

The apparatus 1002/1002' for wireless communication may include means for determining a second threshold to apply in selecting a format, the format used for a second transmission. The second threshold applied in the selection of the format is determined from a second set of values different from the first set of values. The apparatus 1002/1002' for wireless communication may include means for determining a second size of a second payload for a second transmission of control information. The apparatus 1002/1002' for wireless communication may include means for selecting a second format based on the second size of the second payload and the second threshold for the second transmission of control information.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving information in a configuration from a base station;
   determining a first threshold number of bits to apply in selecting a format from a plurality of formats for use by the UE for a first transmission of control information, wherein the first threshold number of bits to apply in selecting the format is based on the information received in the configuration from the base station;
   determining a first size of the first transmission of control information;
   selecting a first format for the first transmission of control information based on the first size and the first threshold number of bits; and
   sending, by the UE, the first transmission on an uplink carrier in accordance with the first format.

2. The method of claim 1, wherein the format comprises a physical uplink control channel (PUCCH) format.

3. The method of claim 1, wherein determining the first threshold number of bits comprises determining a first threshold from a set of thresholds configured for the UE.

4. The method of claim 1, wherein the information received from the base station comprises the first threshold number of bits.

5. The method of claim 4, wherein the configuration is received in a radio resource control (RRC) configuration message.

6. The method of claim 1, further comprising:
   determining a second size of a second transmission of control information; and
   selecting a second format for the second transmission based on the second size of the second transmission of control information and the first threshold number of bits.

7. The method of claim 1, further comprising:
   determining a second threshold to apply in selecting a second format, the second format used for a second transmission of control information, wherein the second threshold is determined from a second set of values different from the first set of values;
   determining a second size of the second transmission; and
   selecting the second format based on the second size and the second threshold for the second transmission of control information.

8. The method of claim 1, wherein the first threshold number of bits is associated with a set of thresholds indicating when each format of a series of formats is used.

9. The method of claim 1, wherein the control information comprises at least one of a HARQ feedback, a channel state information feedback, or a scheduling request.

10. The method of claim 1, wherein each of the plurality of formats has at least one of a respective maximum size or a respective multiplexing capability.

11. The method of claim 1, wherein at least one format of the plurality of formats uses time-domain spreading.

12. The method of claim 1, wherein the first threshold number of bits is associated with a first cell group of a plurality of cell groups.

13. The method of claim 12, wherein a second threshold is determined for a transmission in a second cell group, wherein the second threshold is different from the first threshold number of bits for the first cell group.

14. The method of claim 13, wherein the plurality of cell groups are part of a carrier aggregation operation configured for the UE.

15. The method of claim 12, wherein the plurality of cell groups are part of a dual connectivity operation configured for the UE.

16. A method of wireless communication at a base station, comprising:
    determining a first threshold number of bits for use by a user equipment (UE) in selecting a format from a plurality of formats for a first transmission of control information by the UE;
    sending first threshold information in a configuration for the UE; and
    receiving the first transmission from the UE, the first transmission using the format selected by the UE according to the first threshold number of bits and a size for the first transmission of the control information.

17. The method of claim 16, wherein the format comprises a physical uplink control channel (PUCCH) format.

18. The method of claim 16, wherein the first threshold number of bits is based on a preconfiguration at the UE.

19. The method of claim 16, wherein the first threshold information is sent to the UE via an RRC configuration message.

20. An apparatus for wireless communication, comprising:
    a memory; and
    at least one processor coupled to the memory and configured to:
        receive information in a configuration from a base station;
        determine a first threshold number of bits to apply in selecting a format from a plurality of formats for use by the UE for a first transmission of control information, wherein the first threshold number of bits to apply in the selection of the format is based on the information received in the configuration from the base station;
        determine a first size of the first transmission of control information;
        select a first format for the first transmission of control information based on the first size and the first threshold number of bits; and
        send the first transmission, to a base station, on an uplink carrier in accordance with the first format.

21. The apparatus of claim 20, wherein the format comprises a physical uplink control channel (PUCCH) format.

22. The apparatus of claim 20, wherein the at least one processor is further configured to determine the first threshold number of bits from a set of thresholds configured for the UE.

23. The apparatus of claim 20, wherein the at least one processor is further configured to receive the configuration from the base station in a radio resource control (RRC) configuration message.

24. An apparatus for wireless communication, comprising:
    a memory; and
    at least one processor coupled to the memory and configured to:
        determine a first threshold number of bits for use by a user equipment (UE) in selecting a format from a plurality of formats for a first transmission of control information by the UE;
        send first threshold information in a configuration for the UE; and
        receive the first transmission from the UE, the first transmission using the first format selection by the UE according to the first threshold number of bits and a size for the first transmission of the control information.

25. The apparatus of claim 24, wherein the format comprises a physical uplink control channel (PUCCH) format.

26. The apparatus of claim 24, wherein the at least one processor is configured to send the first threshold information to the UE via an RRC configuration message.

* * * * *